United States Patent Office 2,850,376
Patented Sept. 2, 1958

2,850,376

TREATMENT OF NICKEL-CONTAINING LATERITE ORES

Paul Etienne Queneau, Fairfield, Conn., and Alexander Illis, Copper Cliff, Ontario, Canada, assignors to The International Nickel Company, Inc., New York, N. Y., a corporation of Delaware No Drawing. Application October 12, 1956
Serial No. 615,500

Claims priority, application Canada December 28, 1954

11 Claims. (Cl. 75—82)

The present invention relates to a process for the treatment of nickel-containing ores to recover a large part of the nickel as metal of high purity, and particularly to an improved process of extracting nickel and iron from nickel-containing lateritic ores by an improved carbonyl extraction procedure, and especially to a process for recovering nickel, cobalt, and iron from iron oxide type and silicate type ores by a novel combination of carbonyl extraction and ammonia leaching.

The term lateritic nickel ores refers to the nickel enriched residual products of laterization of nickel-bearing protore. This laterization process involves the extraction of magnesia and silica by atmospheric water leaching in a warm and humid climate. The initial nickel-bearing ore product of laterization, relatively high in silica and magnesia, is henceforth referred to as the silicate type, and the final nickel-bearing ore product, high in ferric oxide and low in silica, is referred to as the iron oxide type. For the purpose of broad generalization within the scope of this patent, iron oxide type ore is considered to contain more than about 40% iron, and silicate type ore less than about 25% iron. Mixtures of these two types occur in which the iron content is in the 25%–40% range.

Numerous processes have been proposed for the extraction of the nickel contained in these ores, such as those of Cuba, New Caledonia, Santo Domingo and Venezuela, including smelting to matte or ferro-nickel, direct acid leaching, solubilizing of nickel by sulfating or chloridizing followed by water or dilute acid leaching, and, after preliminary reduction, extraction of nickel by the carbonyl process or by leaching with acid or ammoniacal solutions. Most of these processes have never been applied commercially due to their complexity and high cost.

One process that has been commercially applied to lateritic nickel ore deposits involves reduction of the ore to convert nickel to the metallic state, followed by leaching of the reduced ore with ammoniacal ammonium carbonate solution. In addition to difficulty of solid-liquid separation in the leaching step, the process suffers from the unsatisfactory physical properties and low chemical purity of the nickel carbonate product obtained upon distillation. Improvements in the practice of this process have been proposed without, however, eliminating these basic problems. Pyrometallurgical processes commercially applied to oxide nickel deposits include blast furnace, kiln and electric furnace smelting for the production of nickel or ferro-nickel. Aside from the high cost of these procedures, the processes suffer from the low purity of the nickel product.

Efforts have been made in the past to apply the carbonyl reaction to the treatment of lateritic nickel ores. When utilizing this principle, the nickel-bearing ore is treated to reduce the nickel to the metallic state which is then volatilized with carbon monoxide as nickel carbonyl, followed by decomposition of the carbonyl to metal. This concept appears attractive because it permits direct production of pure metallic nickel. The basic patent covering carbonyl nickel extraction procedures, including their application to oxide nickel ores, was granted to Ludwig Mond in 1890.

The Mond process was commercially limited to final refining of substantially iron-free intermediate products of high nickel content. One difficulty in applying this process to ores containing nickel and iron resides in the fact that some of the iron is reduced to the metallic state simultaneously with the nickel. As a result, a nickel-iron alloy is formed which becomes less reactive to carbon monoxide as the iron content of the alloy increases, such that the rate of reaction with carbon monoxide under atmospheric pressure becomes unduly slow. Furthermore, the process does not extract any cobalt present in the ore.

Use of the carbonyl process was later suggested for treatment of lateritic nickel-bearing ores of the iron oxide type. Reduction was recommended at temperatures between about 350° C. and 500° C., preferably the former temperature, using water gas or producer gas, the operation being arrested at the point where nickel oxide is reduced to metal and before a significant proportion of iron oxide is reduced to metal. Those skilled in the art will realize the impracticality of such a procedure and furthermore, the reduction temperatures recommended are normally too low for high nickel extraction. It was also suggested that higher reduction temperatures up to about 760° C. be used, to be followed by re-oxidation with steam at elevated temperatures, followed by nickel extraction of cooled and moistened ore by wet carbon monoxide, but this procedure is complex and may result in unsatisfactory nickel extraction in respect to both quantity and quality. In another proposal for the treatment of lateritic nickel-bearing ores of the iron oxide type by carbonyl procedures, it was suggested that such ores be selectively reduced at 600° C. to 900° C., and in such manner that the nickel, but none of the iron, be reduced to the elemental state. This proposal is unsatisfactory since almost the whole of the reduction temperature range recommended is too high for high nickel extraction from iron oxide type ores by carbonyl procedures and is inoperable because satisfactory nickel reduction cannot be obtained without reducing a substantial proportion of iron to the metallic state. In other proposals it has been suggested that a strong, non-selective reducing gas be employed for co-reduction of substantially all of the nickel and iron in lateritic ores, followed by use of elevated pressures for carbonyl extraction in order to make the process operable. However this concept would lead to high costs as applied to lateritic ores and the use of elevated pressure volatilization on the necessary large scale required by such ores greatly increases the complexity of the operation.

Although prior investigators have attempted to overcome the foregoing difficulties and other disadvantages in order to develop a commercially useful carbonyl process for the extraction of nickel from lateritic ores, as far as we are aware their efforts have uniformly met with failure.

One of the important reasons for the failure of the early investigators to develop a useful process is that they attempted to reduce substantially all of the nickel but none of the iron to the metallic state or, by employing non-selective reducing conditions, they reduced substantially all of the nickel but also co-reduced an unduly high proportion of the iron to the metallic state. Using the first method, one cannot obtain the high degree of nickel reduction to the metallic state necessary for high nickel recovery by carbonyl extraction, and using the second method, the high proportion of co-reduced iron prevents high nickel recovery by carbonyl extraction at atmospheric pressure due to formation of a relatively inactive ferro-nickel rich in iron with resulting detriment to nickel volatilization. Furthermore this high proportion of co-reduced iron severely penalizes the optional scavenging ammonia leaching operation of our invention due to the resulting greatly increased iron oxidation and precipitation in the leaching circuit.

We have discovered that, by use of the special selective reducing conditions outlined hereinafter, improved extraction of nickel can be obtained by co-reducing and co-volatilizing with the nickel a substantial but controlled proportion of the iron. A further important discovery is that the carbonyl volatilization of nickel and iron under our conditions not only will not hinder but will assist subsequent extraction of nickel and cobalt by ammonia leaching.

A primary object of the present invention is to provide an improved process for treatment of nickel-containing lateritic ores to recover directly most of the nickel as metal of high purity.

It is another object of the invention to provide an improved process for recovering nickel and cobalt from lateritic ores.

An additional object of the invention is to provide a process which will ease the difficult treatment problem presented by lateritic ores in respect to solid-liquid separation and in respect to cobalt recovery and its separation from nickel.

A further object of this invention is to provide a process permitting a controlled production of iron as valuable metal of high purity in such manner as to increase nickel and cobalt recovery from their lateritic ores.

Other objects and advantages will become apparent from the following description.

We have found that the foregoing disadvantages of the ammonia leaching and carbonyl extraction procedures hitherto disclosed for treating lateritic nickel ores may be avoided by our improved carbonyl extraction method or by a novel combination of our improved carbonyl extraction method and ammonia leaching. In the case of ores low in cobalt content, e. g., less than about 0.05% cobalt, carbonyl extraction alone may be employed. Even in the presence of a high proportion of iron in the ore, a special preferential reduction can be effected so that the nickel reacts readily with carbon monoxide at substantially atmospheric pressure, thereby permitting high nickel extraction together with a controlled significant proportion of iron. This special reduction can be so controlled that nickel and cobalt remaining in the carbon monoxide extracted residue can be recovered readily by ammonia leaching. The past procedures give a lower nickel extraction than that obtained by practice of this invention and no cobalt extraction.

We have found that carbonyl extraction of the major part of the ore's nickel content, with co-removal of metallic iron, improves subsequent nickel and cobalt extraction by ammonia leaching for the following reasons:

(1) Leach solutions of relatively low ammonia and carbon dioxide concentration, e. g., less than about 4% ammonia and not more than about 2% carbon dioxide by weight, can be employed thereby minimizing loss of these reagents and minimizing objectional solution of an ore's magnesia content.

(2) Nickel and cobalt enter the leach solution more rapidly due to the increased porosity or permeability of the ore particles, i. e., the increased surface area exposed to solid-liquid contact due to honeycombing of the particles in the course of prior nickel and iron removal as gaseous carbonyls.

(3) Nickel, and particularly cobalt, losses by co-precipitation with ferric hydroxide are decreased.

(4) The pregnant solution obtained upon leaching of the carbonyl extracted ore contains a much lower nickel to cobalt ratio than that of the original ore. As those skilled in the art will understand, this provides a distinct advantage in the subsequent separation for pure cobalt production.

(5) Since only a minor proportion of the ore's nickel content is involved in the leaching operation, removal of nickel and cobalt from the pregnant solution by chemical precipitation as sulfides, e. g., by hydrogen sulfide, is economically practicable thereby permitting substantial savings over the normal practice of steam distillation for said removal of these elements as basic carbonates.

Generally speaking, the present invention contemplates the treatment of oxide ores containing nickel and cobalt, for example, lateritic ores of the iron oxide or silicate types, to obtain a high recovery of these metals by a novel procedure involving selective reduction of the ore and its carbonyl extraction which may be followed by ammonia leaching of the solids discharge from the carbonyl volatilizer when justified, e. g., by its cobalt content. If scavenging by ammonia leaching is practiced, we have found it may be desirable, in order to improve solid-liquid separations, to remove the finest fraction of the volatilizer discharge, e. g., by elutriation, as for instance by elutriation either in a gas stream or in the first stage of ammonia leaching to remove particles of less than a few microns in diameter. We have also found that improved solid-liquid separation is obtained with an increase in reduction temperature for a given degree of ore reduction. Thus solid-liquid separation considerations, as well as chemical considerations pertinent to cobalt-nickel extractability, may call for a higher reduction temperature than would be employed if carbonyl procedures alone are practiced.

It will be understood that the iron oxide and silicate type ores are ground, if necessary, before the selective reduction operation.

In addition to the reducing atmosphere, temperature of reduction must be judiciously controlled to yield optimum nickel extractions by the combined carbonyl extraction and ammonia leaching procedures. The table below illustrates the importance of proper choice of reduction temperature:

| | Percent of total Ni extracted | | | | | | |
|---|---|---|---|---|---|---|---|
| | Iron oxide type ore, temperature, ° C. | | | | Silicate type ore, temperature, ° C. | | |
| | 425 | 510 | 620 | 670 | 670 | 770 | 870 |
| Atmosphere, $CO:CO_2$ ratio | 1:3 | 1:2.3 | 1:1.7 | 1:1.4 | 1:1 | 1.2:1 | 1.5:1 |
| Carbonyl extraction | 75 | 90 | 80 | 70 | 75 | 82 | 65 |
| $NH_3$ leaching | 1 | 3 | 18 | 28 | 5 | 3 | 20 |
| Overall extraction | 76 | 93 | 98 | 98 | 80 | 85 | 85 |

Reduction time was 2 hours at the temperatures stated. The overall nickel extractions reported in the foregoing table were obtained by a dual procedure involving ammonia leaching after a carbonyl extraction.

In the selective reduction operation, the ore is reduced at temperatures within the range of about 500° C. to 650° C. for iron oxide type ores and within the range of about 650° C. to 850° C. for silicate type ores. The reduction may be conducted in an atmosphere of carbon monoxide, carbon dioxide, hydrogen and water vapor having an equilibrium reducing potential at final reaction temperature which may be expressed as a ratio of carbon monoxide to carbon dioxide of not more than about 3:2 and not less than about 1:3. Generally speaking, the higher the iron content of the ore to be treated the lower should be the $CO:CO_2$ ratio of the selectively reducing gas employed. It will, of course, be understood that the hydrogen to water vapor ratio of the gas at any given temperature is controlled by the carbon monoxide to carbon dioxide ratio stated. The foregoing gas ratio is based on the proportions of carbon monoxide and carbon dioxide in the atmosphere practicably in equilibrium with the hot solid charge in the furnace at the final reaction temperature. These reducing gases can be obtained by the partial combustion of such fuels as coal, oil or natural gas in direct contact with the ore. A suitable reducing atmosphere can, if desired, be obtained by carefully rationed use of rich non-selective gases, e. g., synthesis gas, and reacting such gas in direct contact with the ore at elevated temperatures with resulting production of carbon dioxide and/or water vapor so as to yield an equilibrium reducing potential equivalent to that hereinbefore stated. The reducing power of the furnace atmosphere as well as the temperature and the holding time are adjusted so as to reduce substantially all of the nickel and cobalt to the active elemental state while reducing a substantial but controlled proportion of the iron to the elemental state whereby the iron to nickel ratio in the volatilized carbonyls is not less than about 1:7 and not more than about 2:1. These iron to nickel ratios are normally within the ranges of 1:3 to 2:1 for iron oxide type ores and 1:7 to 1:1 for silicate type ores. For any given ore there is a relatively narrow temperature range and reducing gas composition which will yield optimum nickel extraction. The specific composition of the reducing gas, temperature of reduction and the ratio of volatilized nickel to volatilized iron will depend both on the iron content of the ore which may vary from less than 5% to more than 50% and on the relative proportion of iron oxide type material to silicate type material which may be present as mixtures in the particular ore being treated.

Carbonyl extraction is carried out on the substantially dry, cooled, selectively reduced ore in a volatilizer with carbon monoxide at about atmospheric pressure and at a temperature between about 25° C. and about 75° C. The mixed carbonyls of nickel and iron may be separated, e. g., by liquefaction and fractionation, and then heated separately to their decomposition temperatures to yield high purity metallic nickel and iron. The volatilizer solids discharge, i. e., the carbonyl-extracted ore, after discard of its finest size fraction if desired, then may be ammonia leached to extract cobalt and residual nickel.

The finer particles in lateritic ore, only a few microns in diameter or less, tend to settle reluctantly and occlude liquid, and some of them possess undesirable surface active properties which tend to immobilize nickel and cobalt ions. The difficulties which result during leaching can be avoided by prior discard of these particles. Substantially all of the nickel contained in the finest size fraction of the ore can be extracted as carbonyl, the rate and extent of such extraction increasing with decrease in particle size. These ultra-fines are much less troublesome in the dry carbonyl process than in wet extraction procedures. In this connection it is important to note that gas velocities of the order of only one foot per minute can be successfully employed in the former process.

The ammonia leaching operation referred to in the following examples comprises treatment of the selectively reduced and carbon monoxide extracted ore in oxygenated ammoniacal ammonium carbonate solution with resulting nickel and cobalt solution and recovery.

*Example I*

As an illustration of the advantages of this invention, a nickel ore of the silicate type containing 1.8% nickel, 0.03% cobalt, and 15% iron was ground to 5% plus 100 mesh, and selectively reduced in a directly fired rotary kiln using water gas as fuel at a rate of one ton per day and at a temperature of 770° C. in an atmosphere containing $CO$, $CO_2$, $H_2$ and $H_2O$ and having a $CO:CO_2$ ratio of 1.2:1. The selectively reduced ore was then cooled to 50° C. and treated in a carbonyl volatilizer at atmospheric pressure in 92% carbon monoxide gas which volatilized 82% of the nickel and 2.5% of the iron as mixed carbonyls having an Fe:Ni ratio of 1:4.

*Example II*

As an illustration of the advantages of the dual extraction process of this invention, a lateritic nickel ore of the iron oxide type containing approximately 1.1% nickel, 0.1% cobalt and 50% iron was ground to 6% plus 200 mesh, and selectively reduced at a reaction temperature of 645° C. in an atmosphere containing $CO$, $CO_2$, $H_2$ and $H_2O$ and having a ratio of $CO:CO_2$ of 1:1.5 at the above temperature. The selectively reduced ore was cooled to 50° C. and treated in a carbonyl volatilizer at atmospheric pressure with gas containing 92% carbon monoxide. This operation rapidly volatilized 76% of the nickel content of the ore and 1.7% of its iron content as mixed carbonyls having an Fe:Ni ratio of 1:1. The solids from the volatilizer were then ammonia leached at atmospheric pressure and the total metals extracted by the dual extraction process of this invention amounted to 98% of the nickel content of the ore and 80% of the cobalt content of the ore. When the above ore was reduced at the above temperature and in a similar atmosphere to the above, but one having a ratio of $CO:CO_2$ of 2:1, carbonyl treatment as above resulted in only 28% nickel extraction, the mixed carbonyls had an Fe:Ni ratio of 10:1, and ammonia leaching of the solids from the volatilizer required oxidation and precipitation of ten times as much iron as the above.

As an illustration of the advantages of separating coarse from fine fractions in accordance with the present invention, the following example is given. A lateritic nickel ore of the silicate type was ground to 1% plus 35 mesh and 16% less than 10 microns, and was selectively reduced and carbonyl extracted in a manner similar to that disclosed in Example I. A residue was obtained which was divided into two equal samples. One sample was subjected to ammonia leaching and then subjected to solid-liquid separation tests. A settling time of 300 minutes was required in order to obtain a pulp of 51% solids. The second sample was gas elutriated to separate a coarse fraction representing 80% by weight of the sample and containing 4% by weight of particles less than 10 microns in diameter, and a fine fraction consisting of particles nearly all less than 10 microns in diameter. These two fractions were then given the same ammonia leaching treatment as the first sample and they were then subjected to solid-liquid separation tests. A settling time of only 30 minutes was required in order to obtain a pulp of 56% solids in the case of the coarse fraction whereas 900 minutes was required to obtain a pulp containing 33% solids in the case of the fine fraction. Removal of the fine fraction thus gave a solid:liquid ratio of settled pulp 22% higher than that of the overall leached ore and increased settling rate tenfold.

It is to be observed that the present invention provides broadly a process for recovering nickel from finely-divided iron oxide and silicate ore of the lateritic type by carbonyl extraction which may be followed by ammonia leaching. The new process comprises reducing the ore by heating it to an elevated temperature not less than about 500° C. in a selectively reducing atmosphere having a $CO:CO_2$ ratio at final reaction temperature of not more than about 3:2 and not less than about 1:3, regulating these reducing conditions so as to convert a maximum proportion of the nickel and cobalt and a substantial but limited proportion of the iron to an active, elemental state whereby the nickel is amenable to high extraction and the iron is amenable to partial extraction by carbonyl procedures and yet the so reduced ore is amenable to optimum nickel and cobalt extraction by ammonia leaching procedures, then treating the selectively reduced, cooled, substantially dry ore with carbon monoxide at about atmospheric pressure to volatilize most of the nickel in the ore as nickel carbonyl and a substantial, controlled proportion of the iron in the ore as iron carbonyl whereby the iron to nickel ratio in the volatilized carbonyls is not less than about 1:7 and not more than about 2:1, separating the mixed carbonyls from each other so as to permit production of high purity metallic nickel and high purity metallic iron, which may be followed by ammonia leaching of the carbonyl extracted ore, with optional prior discard of the finest particles therein, in order to scavenge substantially all of the cobalt and the residual nickel.

This application is a continuation-in-part of our copending U. S. application Serial No. 555,282, filed December 27, 1955, now abandoned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In a process for recovering nickel and a controlled proportion of iron from lateritic nickel-bearing ores, the improvement which comprises selectively reducing the ore within the temperature range of about 500° C. to 850° C. in an atmosphere containing carbon monoxide and carbon dioxide in a ratio of carbon monoxide to carbon dioxide of not more than about 3 to 2 and not less than about 1 to 3 or the equivalent thereof in ratio of hydrogen to water vapor, regulating these reducing conditions so as to convert a maximum proportion of the nickel and a substantial but limited proportion of the iron to an active, elemental state whereby the nickel is amenable to high extraction and the iron is amenable to partial extraction by carbonyl procedures, then treating the selectively reduced, cooled, substantially dry ore with carbon monoxide to volatilize most of the nickel in the ore as nickel carbonyl together with a controlled proportion of the iron in the ore as iron carbonyl whereby the iron to nickel ratio in the volatilized carbonyls is not less than about 1 to 7 and not more than about 2 to 1 and separating the mixed carbonyls from each other so as to permit production of high purity metallic nickel and high purity metallic iron.

2. A process for recovering nickel, cobalt and a controlled proportion of iron from lateritic nickel- and cobalt-bearing ores by a combination of carbonyl extraction and ammonia leaching which comprises reducing the ore at a temperature not less than about 500° C. and not more than about 850° C. in a selectively reducing atmosphere containing carbon monoxide and carbon dioxide in a ratio of carbon monoxide to carbon dioxide of not more than about 3 to 2 and not less than about 1 to 3, or the equivalent thereof in ratio of hydrogen to water vapor in an atmosphere containing these gases, regulating these reducing conditions so as to convert a maximum proportion of the nickel and a substantial but limited proportion of the iron to an active, elemental state whereby the nickel is amenable to high extraction and the iron is amenable to partial extraction by carbonyl procedures, and yet the so reduced ore is amenable to optimum nickel and cobalt extraction by ammonia leaching procedures, then treating the selectively reduced, cooled ore with carbon monoxide to volatilize most of the nickel in the ore as nickel carbonyl together with a significant proportion of the iron in the ore as iron carbonyl whereby the iron to nickel ratio in the total volatilized carbonyls is not more than about 2 to 1 and not less than about 1 to 7, and separating the mixed carbonyls from each other so as to permit production of metallic nickel and metallic iron, and ammonia leaching the carbonyl-extracted ore in order to recover most of the cobalt and substantially all of the residual nickel.

3. A process for recovering nickel, cobalt and a controlled proportion of iron from lateritic nickel- and cobalt-bearing ores by a combination of carbonyl extraction and ammonia leaching which comprises reducing the ore at a temperature not less than about 500° C. and not more than about 850° C. in a selectively reducing atmosphere containing carbon monoxide and carbon dioxide in a ratio of carbon monoxide to carbon dioxide of not more than about 3 to 2 and not less than about 1 to 3, or the equivalent thereof in ratio of hydrogen to water vapor in an atmosphere containing these gases, regulating these reducing conditions so as to convert a maximum proportion of the nickel, cobalt and a substantial but limited proportion of the iron to an active, elemental state whereby the nickel is amenable to high extraction and the iron is amenable to partial extraction by carbonyl procedures, and yet the so reduced ore is amenable to optimum nickel and cobalt extraction by ammonia leaching procedures, then treating the selectively reduced, cooled ore with carbon monoxide to volatilize most of the nickel in the ore as nickel carbonyl together with a significant proportion of the iron in the ore as iron carbonyl whereby the iron to nickel ratio in the total volatilized carbonyls is not more than about 2 to 1 and not less than about 1 to 7, separating the mixed carbonyls from each other so as to permit production of high purity metallic nickel and high purity metallic iron, ammonia leaching the carbonyl-extracted ore in order to dissolve most of the cobalt and substantially all of the residual nickel, and precipitating the cobalt and nickel from the pregnant ammoniacal leach solution with hydrogen sulfide.

4. A process for recovering nickel, cobalt and a controlled proportion of iron from lateritic nickel- and cobalt-bearing ores by a combination of carbonyl extraction and ammonia leaching which comprises reducing the ore at a temperature not less than about 500° C. and not more than about 850° C. in a selectively reducing atmosphere containing carbon monoxide and carbon dioxide in a ratio of carbon monoxide to carbon dioxide of not more than about 3 to 2 and not less than about 1 to 3, or the equivalent thereof in ratio of hydrogen to water vapor in an atmosphere containing these gases, regulating these reducing conditions so as to convert a maximum proportion of the nickel, cobalt and a substantial but limited proportion of the iron to an active, elemental state whereby the nickel is amenable to high extraction and the iron is amenable to partial extraction by carbonyl procedures, and yet the so reduced ore is amenable to optimum nickel and cobalt extraction by ammonia leaching procedures, then treating the selectively reduced, cooled ore with carbon monoxide to volatilize as nickel carbonyl most of the nickel from the coarser particles of the ore while simultaneously volatilizing substantially all of the nickel from the finest particles of the ore, together with a significant proportion of the iron in the ore as iron carbonyl whereby the iron to nickel ratio in the total volatilized carbonyls is not more than about 2 to 1 and not less than about 1 to 7, separating the mixed carbonyls from each other so as to permit production of metallic nickel and metallic iron, removing the fine size fraction from the carbonyl-extracted ore and ammonia leaching the carbonyl-extracted coarse fraction of the ore in order to recover most of the cobalt and substantially all of the residual nickel.

5. A process for recovering nickel, cobalt and a controlled proportion of iron from lateritic nickel- and cobalt-bearing ores by a combination of carbonyl extraction and ammonia leaching which comprises reducing the ore at a temperature not less than about 500° C. and not more than about 850° C. in a selectively reducing atmosphere containing carbon monoxide and carbon dioxide in a ratio of carbon monoxide to carbon dioxide of not more than about 3 to 2 and not less than about 1 to 3, or the equivalent thereof in ratio of hydrogen to water vapor in an atmosphere containing these gases, regulating these reducing conditions so as to convert a maximum proportion of the nickel, cobalt and a substantial but limited proportion of the iron to an active, elemental state whereby the nickel is amenable to high extraction and the iron is amenable to partial extraction by carbonyl procedures, and yet the so reduced ore is amenable to optimum nickel and cobalt extraction by ammonia leaching procedures, then treating the selectively reduced, cooled ore with carbon monoxide to volatilize as nickel carbonyl most of the nickel from the coarser particles of the ore while simultaneously volatilizing substantially all of the nickel from the finest fraction of the ore, together with a significant proportion of the iron in the ore as iron carbonyl whereby the iron to nickel ratio in the total volatilized carbonyls is not more than about 2 to 1 and not less than about 1 to 7, separating the mixed carbonyls from each other so as to permit production of metallic nickel and metallic iron, removing the fine size fraction from the carbonyl-extracted ore by elutriation in ammonia leaching liquor, and ammonia leaching the coarse size fraction in order to recover most of the cobalt and substantially all of the residual nickel.

6. A process for recovering nickel, cobalt and a controlled proportion of iron from lateritic nickel- and cobalt-bearing ores by a combination of carbonyl extraction and ammonia leaching which comprises selectively reducing the ore at a temperature not less than about 500° C. and not more than about 850° C. in an atmosphere containing carbon monoxide, carbon dioxide, hydrogen and water vapor and having at final reaction temperature a ratio of carbon monoxide to carbon dioxide of not more than about 3 to 2 and not less than about 1 to 3, regulating these reducing conditions so as to convert a maximum proportion of the nickel, cobalt and a substantial but limited proportion of the iron to an active, elemental state whereby the nickel is amenable to high extraction and the iron is amenable to partial extraction by carbonyl procedures, and yet the so reduced ore is amenable to optimum nickel and cobalt extraction by ammonia leaching procedures, then treating the selectively reduced, cooled, substantially dry ore with carbon monoxide at about atmospheric pressure and at a temperature above 25° C. and below 75° C. to volatilize as nickel carbonyl most of the nickel from the coarser particles of the ore while simultaneously volatilizing substantially all of the nickel from the finest particles of the ore, together with a significant proportion of the iron in the ore as iron carbonyl whereby the iron to nickel ratio in the total volatilized carbonyls is not more than about 2 to 1 and not less than about 1 to 7, separating the mixed carbonyls from each other so as to permit production of metallic nickel and metallic iron, removing the fine size fraction from the carbonyl extracted ore by gas elutriation and ammonia leaching the carbonyl-extracted coarse fraction of the ore in order to cover most of the cobalt and substantially all of the residual nickel.

7. A process for recovering nickel and a controlled proportion of iron from iron oxide type nickel-bearing ores containing more than about 40% iron which comprises selectively reducing the ore at a temperature not less than about 500° C. and below about 650° C. in an atmosphere containing carbon monoxide and carbon dioxide in a ratio of carbon monoxide to carbon dioxide of not more than about 3 to 2 and not less than about 1 to 3 or the equivalent thereof in ratio of hydrogen to water vapor, regulating these reducing conditions so as to convert a maximum proportion of the nickel and a substantial but limited proportion of the iron to an active, elemental state whereby the nickel is amenable to optimum extraction and the iron is amenable to partial extraction by carbonyl procedures, then treating the selectively reduced, cooled, substantially dry ore with carbon monoxide at about atmospheric pressure and at a temperature from about 25° C. to below 75° C. to volatilize substantially all of the nickel in the ore as nickel carbonyl together with a controlled proportion of the iron in the ore as iron carbonyl whereby the iron to nickel ratio in the volatilized carbonyls is not less than about 1 to 3 and not more than about 2 to 1 and separating the mixed carbonyls from each other so as to permit production of high purity metallic nickel and high purity metallic iron.

8. A process for recovering nickel, cobalt and a controlled proportion of iron from iron oxide type nickel- and cobalt-bearing ores containing more than about 40% iron and not less than about 0.05% cobalt by a combination of carbonyl extraction and ammonia leaching which comprises selectively reducing the ore at a temperature not less than about 500° C. and less than about 650° C. in an atmosphere containing carbon monoxide and carbon dioxide in a ratio of carbon monoxide to carbon dioxide of not more than about 3 to 2 and not less than about 1 to 3 or the equivalent thereof in ratio of hydrogen to water vapor, regulating these reducing conditions so as to convert a maximum proportion of the nickel, cobalt and a substantial but limited proportion of the iron to an active, elemental state whereby the nickel is amenable to high extraction and the iron is amenable to partial extraction by carbonyl procedures, and yet the so reduced ore is amenable to optimum nickel and cobalt extraction by ammonia leaching procedures, then treating the so reduced, cooled, substantially dry ore with carbon monoxide at about atmospheric pressure and at a temperature above 25° C. and below 75° C. to volatilize most of the nickel in the ore as nickel carbonyl together with a controlled proportion of the iron in the ore as iron carbonyl whereby the iron to nickel ratio in the volatilized carbonyls is not less than about 1 to 3 and not more than about 2 to 1, separating the mixed carbonyls from each other so as to permit production of high purity metallic nickel and high purity metallic iron, and ammonia leaching the carbonyl extracted ore in order to recover most of the cobalt and substantially all of the residual nickel.

9. A process for recovering nickel, cobalt and a controlled proportion of iron from iron oxide type nickel- and cobalt-bearing ores containing more than about 40% iron and not less than about 0.05% cobalt by a combination of carbonyl extraction and ammonia leaching which comprises selectively reducing the ore at a temperature not less than about 500° C. and less than about 650° C. in an atmosphere containing carbon monoxide and carbon dioxide in a ratio of carbon monoxide to carbon dioxide at final reaction temperature of not more than about 3 to 2 and not less than about 1 to 3 or the equivalent thereof in ratio of hydrogen to water vapor, regulating these reducing conditions so as to convert a maximum proportion of the nickel, cobalt and a substantial but limited proportion of the iron to an active, elemental state whereby the nickel is amenable to high extraction and the iron is amenable to partial extraction by carbonyl procedures and yet the so reduced ore is amenable to optimum nickel and cobalt extraction by ammonia leaching procedures, then treating the so reduced, cooled, substantially dry ore with carbon monoxide at substantially atmospheric pressure and at a temperature above 25° C. and below 75° C. to volatilize most of the nickel in the ore as nickel carbonyl together with a controlled proportion of the iron in the ore as iron carbonyl whereby the iron to nickel ratio in the volatilized carbonyls is not less than about 1 to 3 and not more than about 2 to 1, separating the mixed carbonyls from each other so as to permit production of high purity metallic nickel and high purity metallic iron, ammonia leaching the carbonyl extracted ore in an ammoniacal ammonium carbonate solution containing less than about 4% ammonia and not more than about 2% carbon dioxide by weight to dissolve most of the cobalt and substantially all of the residual nickel and precipitating the cobalt and nickel from the ammoniacal pregnant solution with hydrogen sulfide.

10. A process for recovering nickel and a controlled proportion of iron from silicate type nickel-bearing ores containing less than about 25% iron which comprises selectively reducing the ore at a temperature more than about 650° C. and not more than about 850° C. in an atmosphere containing carbon monoxide and carbon dioxide in a ratio of carbon monoxide to carbon dioxide of not more than about 3 to 2 and not less than about 1 to 3 or the equivalent thereof in ratio of hydrogen to water vapor, regulating these reducing conditions so as to convert a maximum proportion of the nickel and a substantial but limited proportion of the iron to an active, elemental state, whereby the nickel is amenable to optimum extraction and the iron is amenable to partial extraction by carbonyl procedures, then treating the selectively reduced, cooled, substantially dry ore with carbon monoxide at substantially atmospheric pressure and at a temperature above 25° C. and below 75° C. to volatilize most of the nickel in the ore as nickel carbonyl together with a controlled proportion of the iron in the ore as iron carbonyl whereby the iron to nickel ratio in the volatilized carbonyls is not less than about 1 to 7 and not more than about 1 to 1 and separating the mixed carbonyls from each other so as to permit production of high purity metallic nickel and high purity metallic iron.

11. A process for recovering nickel, cobalt and a controlled proportion of iron from finely divided silicate type nickel- and cobalt-bearing ores containing less than about 25% iron and not less than about 0.05% cobalt by a combination of carbonyl extraction and ammonia leaching which comprises reducing the ore at a temperature above about 650° C. and not more than about 850° C. in an atmosphere containing carbon monoxide, carbon dioxide, hydrogen and water vapor and having a ratio of carbon monoxide to carbon dioxide of not more than about 3 to 2 and not less than about 1 to 3, regulating these reducing conditions so as to convert a maximum proportion of the nickel, cobalt and a substantial but limited proportion of the iron to an active, elemental state whereby the nickel is amenable to high extraction and the iron is amenable to partial extraction by carbonyl procedures, and yet the so reduced ore is amenable to optimum nickel and cobalt extraction by ammonia leaching procedures, then treating the selectively reduced, cooled, substantially dry ore with carbon monoxide at about atmospheric pressure and at a temperature above 25° C. and below 75° C. to volatilize as nickel carbonyl most of the nickel in the ore, together with a controlled proportion of the iron in the ore as iron carbonyl whereby the iron to nickel ratio in the total volatilized carbonyls is not less than about 1 to 7 and not more than about 1 to 1, separating the mixed carbonyls from each other so as to permit production of metallic nickel and metallic iron, and ammonia leaching the carbonyl-extracted ore in an ammoniacal ammonium carbonate solution containing less than about 4% ammonia and not more than about 2% carbon dioxide in order to recover most of the cobalt and the residual nickel.

References Cited in the file of this patent

UNITED STATES PATENTS

| | | |
|---|---|---|
| 2,212,459 | Simpson | Aug. 20, 1940 |
| 2,221,061 | Simpson | Nov. 12, 1940 |
| 2,254,158 | Simpson | Aug. 26, 1941 |
| 2,400,098 | Brogdon | May 14, 1946 |
| 2,400,115 | Hills et al. | May 14, 1946 |
| 2,473,795 | Hills et al. | June 21, 1949 |